(12) United States Patent
Shani et al.

(10) Patent No.: US 12,223,197 B2
(45) Date of Patent: Feb. 11, 2025

(54) METADATA-BASED DATA COPYING (71) Applicant: Dell Products L.P., Round Rock, TX (US)

(72) Inventors: Nimrod Shani, Raanana (IL); Tal Zohar, Tel Aviv (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 17/870,992

(22) Filed: Jul. 22, 2022

(65) Prior Publication Data

US 2024/0028240 A1    Jan. 25, 2024

(51) Int. Cl.
*G06F 3/06* (2006.01)
(52) U.S. Cl.
CPC ............. *G06F 3/065* (2013.01); *G06F 3/064* (2013.01); *G06F 3/0607* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 9,696,919 B1 | 7/2017 | Vankamamidi et al. | |
| 9,916,112 B1* | 3/2018 | Taylor | G06F 3/0608 |
| 10,146,454 B1 | 12/2018 | Koli et al. | |
| 10,318,178 B1 | 6/2019 | Feng et al. | |
| 11,366,594 B2 | 6/2022 | Ruff et al. | |
| 2010/0211616 A1* | 8/2010 | Khandelwal | G06F 12/0868 710/52 |
| 2016/0070652 A1* | 3/2016 | Sundararaman | G06F 3/0665 711/154 |

\* cited by examiner

*Primary Examiner* — Michael Alsip
(74) *Attorney, Agent, or Firm* — BainwoodHuang (57) ABSTRACT

A technique for copying data from a source range to a destination range includes identifying a chunk of the source range. The chunk includes multiple logical blocks that map, through a series of source-mapping pages, to a set of virtual pages that point to physical data of the chunk. The technique further includes copying the series of source-mapping pages to form a corresponding series of destination-mapping pages pointed to by the destination range, so that a corresponding chunk of the destination range maps, via the series of destination-mapping pages, to the same set of virtual pages mapped to by the series of source mapping pages.

21 Claims, 5 Drawing Sheets

METADATA-BASED DATA COPYING

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Many storage systems support XCOPY functionality. XCOPY is a command that operates at the storage-system level to copy data from a source range to a destination range. The copying generally involves a storage system reading data into cache from the source range and then writing the same data back in the storage system at the destination range. Because it operates entirely within the storage system, XCOPY commands avoid significant network traffic that would otherwise result if a host computer were to manage the copying itself. XCOPY is thus popular in applications that involve making many copies of large amounts of data, such as when creating virtual machines.

Some XCOPY approaches use deduplication when writing back data. For example, a storage system may attempt to match candidate blocks (blocks to be written to the destination) with target blocks already stored in the system. If a candidate block matches a target block, the storage system can effectuate storage of the candidate block by reference to the target block—without having to store the data of the candidate block a second time. Deduplication when performing XCOPY greatly improves storage efficiency.

SUMMARY

Unfortunately, XCOPY approaches that use deduplication when writing back data can still be less efficient than desired. For example, deduplication generally entails hashing candidate blocks, performing hash-based lookups into a database for locating matching target blocks, and then individually adjusting metadata of matched candidate blocks to point to matching target blocks. We have recognized, however, that XCOPY presents an unusual case, because with XCOPY it is known in advance that all blocks copied to the destination are already present in the storage system at the source. What is needed, therefore, is a way of effectuating storage of blocks being copied from a source to a destination without having to copy the actual data of the blocks and without having to process each of the blocks individually for deduplication.

The above need is addressed at least in part by an improved technique for copying data from a source range to a destination range. The technique includes identifying a chunk of the source range. The chunk includes multiple logical blocks that map, through a series of source-mapping pages, to a set of virtual pages that point to physical data of the chunk. The technique further includes copying the series of source-mapping pages to form a corresponding series of destination-mapping pages pointed to by the destination range, so that a corresponding chunk of the destination range maps, via the series of destination-mapping pages, to the same set of virtual pages mapped to by the series of source mapping pages. The destination range thereby points to the same data as the source range and provides a copy thereof.

Advantageously, the improved technique effectively copies the chunk in the source range to the destination range without having to copy the underlying data and without having to perform block-level deduplication on the logical blocks within the chunk. The improved technique thereby achieves a dramatic increase in copying efficiency.

Certain embodiments are directed to a method of copying data. The method includes receiving a request to copy a set of data from a source range to a destination range and identifying a chunk of the source range. The chunk includes multiple logical blocks that are mapped, through a series of source-mapping pages, to a set of virtual pages that point to physical data of the chunk. The method further includes copying the series of source-mapping pages to a corresponding series of destination-mapping pages pointed to by the destination range. The corresponding series of destination-mapping pages map a corresponding chunk of the destination range to the set of virtual pages. The destination range thereby points to the physical data of the chunk of the source range and provides a copy thereof.

Other embodiments are directed to a computerized apparatus constructed and arranged to perform a method of copying data, such as the method described above. Still other embodiments are directed to a computer program product. The computer program product stores instructions which, when executed on control circuitry of a computerized apparatus, cause the computerized apparatus to perform a method of copying data, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for copying data from a source range to a destination range includes identifying a chunk of the source range. The chunk includes multiple logical blocks that map, through a series of source-mapping pages, to a set of virtual pages that point to physical data of the chunk. The technique further includes copying the series of source-mapping pages to form a corresponding series of destination-mapping pages pointed to by the destination range, so that a corresponding chunk of the destination range maps, via the series of destination-mapping pages, to the same set of virtual pages mapped to by the series of source mapping pages.

Figure 1:
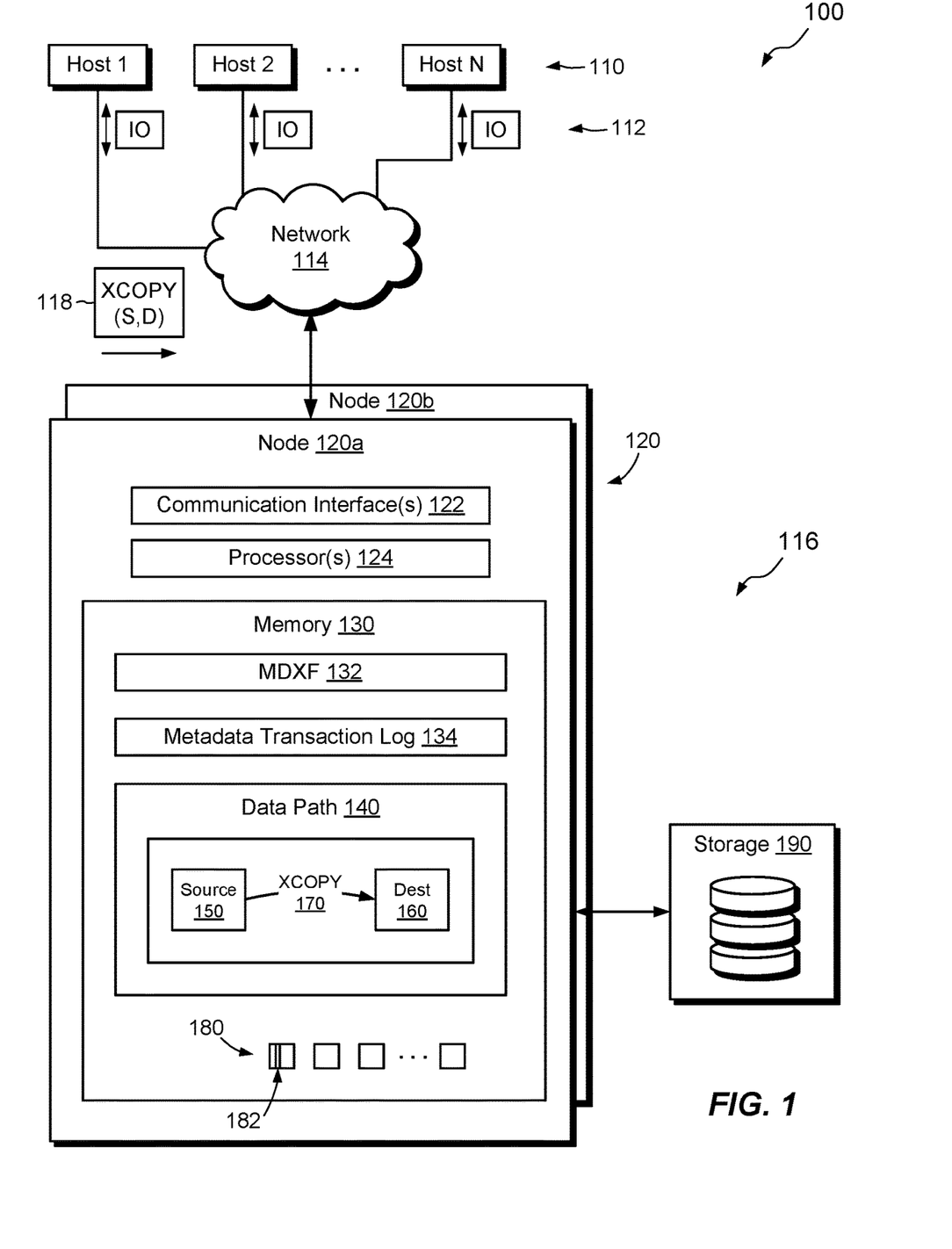
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a metadata-based XCOPY facility (MBXF) 132, a metadata transaction log 134, a data path 140, and any number of data objects 180, such as volumes, LUNs (Logical UNits), file systems, virtual machine disks, and the like. The data objects 180 may be composed of blocks 182, where a "block" is a unit of allocatable storage space. Blocks 182 typically have uniform size, such as 4 kB (kilobytes), 8 kB, or any other suitable size. The data storage system 116 is configured to access the data objects 180 by specifying blocks of the data objects to be created, read, updated, or deleted. Although data objects 180 may be represented by programming objects in memory 130, one should appreciate that the data of such data objects 180 are typically persisted in storage 190.

The metadata-based XCOPY facility (MBXF) 132 is configured to respond to XCOPY requests, which may arrive, for example, from hosts 110, from administrators, and/or from other components of the data storage system 116. As will be described, the MDXF 132 is configured to respond to XCOPY requests by performing metadata-only transactions involving the data path 140. Such transactions for an XCOPY request have the effect of logically copying data from a specified source range 150 in the storage system 116 to a specified destination range 160.

The metadata transaction log 134 is configured to store metadata changes in the form of transactions. In an example, an individual transaction may include multiple metadata operations, such as allocating metadata pages, updating metadata pages, deleting metadata pages, and the like. The metadata transaction log 134 is managed such that the various metadata operations for any given transaction are performed atomically, meaning that all operations are performed to completion or none of them are performed at all. In an example, the metadata transaction log 134 maintains transactions in a time-ordered sequence.

The data path 140 is configured to provide metadata for accessing and organizing data objects 180. As described in more detail below, data path 140 may include various logical blocks, mapping structures, and block virtualization structures.

In example operation, hosts 110 issue I/O requests 112 to the data storage system 116. Node 120a receives the I/O requests 112 at the communication interfaces 122 and initiates further processing. Such processing may include reading and/or writing data of one or more of the data objects 180.

At some point during operation, a host 110, a separate administrator, or some other entity, may issue an XCOPY request 118. The XCOPY request 118 directs the storage system 116 to copy data from a specified source range (S) 150 to a specified destination range (D) 160. The source range 150 specifies a location from which data are to be copied, and the destination range 160 specifies a location to which the data specified by the source range are to be copied. In an example, the XCOPY request 118 may specify the source range 150 and the destination range 160 by logical address ranges, such as by LUN and offset, by file names or directory names, by file handles, or in any other suitable way, which may be specific to the type of data object 180 involved. Upon receipt of the XCOPY request 118 by node 120a, the MDXF 132 orchestrates various activities for conducting an XCOPY operation 170 in response to the request 118. Details of the XCOPY operation 170 will now be described in connection with FIGS. 2a and 2b.

Figure 2A:
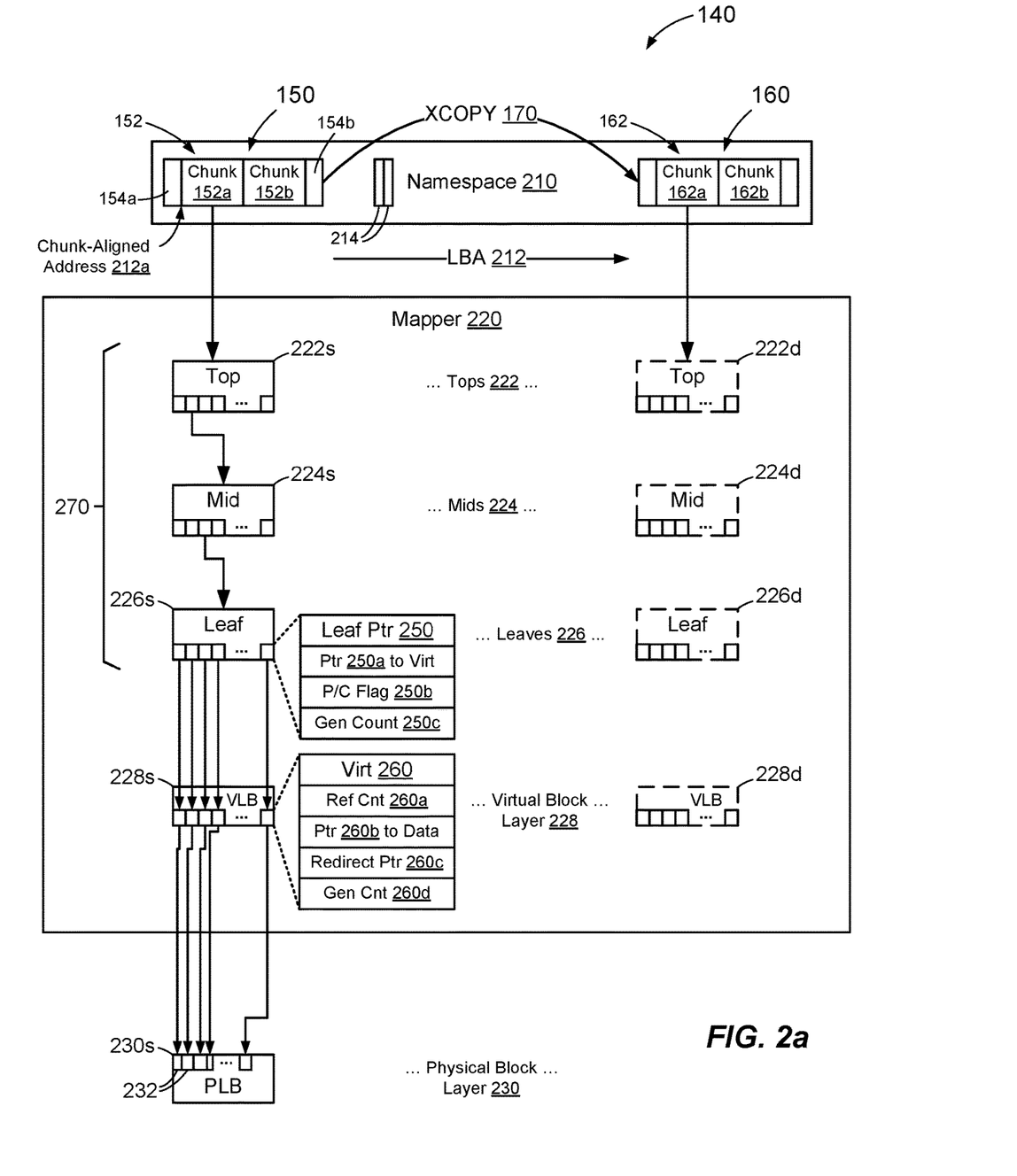
FIGS. 2a and 2b are block diagrams showing respective views of an example data path of FIG. 1 in which a metadata-based data copy is being performed.

FIG. 2a shows an example of the data path 140 in which aspects of the XCOPY operation 170 may be performed. As shown, the data path 140 includes a namespace 210, a mapping structure ("mapper") 220, and a physical block layer 230. The namespace 210 is configured to organize logical data, such as data of volumes, file systems, virtual machine disks, snapshots, clones, and/or the like in a single logical address space, which can be very large (e.g., 8 exabytes). In an example, the namespace 210 is denominated in logical blocks 214 having associated logical addresses, which may be identified by LBA (logical block address) 212. In an example, the namespace 210 is configured to map logical addresses specific to particular data objects (e.g., LUN and offset, file name and range, etc.) to corresponding ranges of LBA 212, such that all logical data managed by the storage system 116 can be represented by LBA ranges in the namespace 210.

The mapper 220 is configured to map logical blocks 214 in the namespace 210 to corresponding physical blocks 232 in the physical block layer 230. The physical blocks 232 are normally compressed and may thus have non-uniform size. The mapper 220 may include multiple levels of mapping structures arranged in a tree. The levels include tops 222, mids 224, and leaves 226, which together are capable of mapping large amounts of data. The mapper 220 may also include a layer of virtuals 228, i.e., block virtualization structures for providing indirection between the leaves 226 and physical blocks 232, thus enabling physical blocks 232 to be moved without disturbing leaves 226.

The tops 222, mids 224, leaves 226, and virtuals 228 may be arranged in mapping pages, where each mapping page includes a respective array of pointers. For example, a top page 222s may include hundreds of pointers (e.g., 512 pointers, 1024 pointers, etc.), for pointing to respective mid pages 224. Likewise, a mid page 224s may include hundreds of pointers for pointing to respective leaf pages 226. Also, a leaf page 226s may include hundreds of pointers 250 for pointing to respective virtuals 260. The virtuals 260 pointed to by the pointers 250 in the leaf page 226s may all reside within a single virtual page 228s, or they may reside within multiple virtual pages in the virtual page layer 228. Physical blocks 232 may be arranged in physical large blocks (PLBs). See, for example, PLB 230s.

FIG. 2a further shows an example leaf pointer 250 and an example virtual 260 in greater detail. An example leaf pointer 250 is seen to include the following fields:

Pointer 250a to Virtual. A pointer (e.g., an address) of the virtual 260 associated with the leaf pointer 250. Each leaf pointer 250 may be associated with a single respective virtual 260.

P/C Flag 250b. A flag or other indicator that specifies whether the leaf pointer 250 is a parent or a child. Parent/child relationships may be formed, for example, by snapshots, clones, and the like. A leaf pointer for a base object may be considered to be a parent, whereas a leaf pointer in a snapshot may be considered to be a child. This distinction can become relevant when moving or copying pointers, e.g., for avoiding deadlocks.

Generation Count 250c. A generation number used, for example, for detecting whether a virtual 260 has been redirected to a new location, e.g., as a result of defragmentation or deduplication.

An example virtual 260 may include the following fields:

Reference Count 260a. A number of pointers in the mapper 220 that point directly to the virtual 260, e.g., a number of leaf pointers 250 that point to the virtual.

Pointer 260b to Data. A pointer (e.g., an address) of a physical block 232 that stores data associated with the virtual 260.

Redirect Pointer 260c. A pointer to a new virtual that is intended to replace the virtual 260 for locating a physical block 232. Relevant to defragmentation and certain forms of deduplication.

Generation Count 260d. A generation number, which is used, for example, for detecting whether the virtual 260 is being redirected to a new location. For example, when accessing a physical block 232 from a leaf pointer 250, the data path 140 compares the generation count 250c in the leaf pointer with the generation count 260d in the virtual 260. If the two generation counts match, then there is no redirection and the virtual 260 properly maps to the physical block 232. But if the two generation counts do not match, then the virtual 260 is no longer current and data path 140 locates the current virtual for the physical block 232 by following the redirect pointer 260c.

One should appreciate that the depicted fields of the leaf pointer 250 and the virtual 260 are merely examples, which help to illustrate certain activities that may be relevant to this disclosure. Other embodiments may contain different fields, additional fields, or fewer fields.

In an example, each leaf pointer 250 corresponds to a respective logical block 214 in the namespace 210. Thus, for example, there may be a one-to-one relationship between logical blocks 214 and leaf pointers 250. Also, consecutive leaf pointers 250 in a leaf page correspond to consecutive logical blocks 214, i.e., logical blocks with consecutive LBAs 212. Thus, a leaf page 226s that includes 512 leaf pointers 250 can map up to 512 consecutive logical blocks 214, which equates to 2 MB of logical space (assuming a 4-kB logical block size). The number of logical blocks being mapped increases for higher levels of the mapper 220. For example, mid page 224s can map up to 512 leaf pages, for a total of 1 GB of logical space. Likewise, top page 222s can map up to 512 mid pages, for a total of 512 GB. In an example, the mapper 220 associates top pages 222 with respective logical address ranges of the namespace 210. Thus, top page 222s may be associated with a particular 512-GB range of contiguous logical data in the namespace 210. To access a particular physical block 232 for a particular logical block 214, the mapper 220 identifies the top page 222 that maps the range of LBAs that include the logical block, locates the pointer in that top page 222 that maps an associated subrange, locates the associated mid page 224 and mid pointer, follows that mid pointer to the associated leaf page 226, and identifies the associated leaf pointer 250. The identified leaf pointer 250 then points to the physical block 232. Here, the pointing from the leaf pointer 250 to the physical block 232 is indirect, as the leaf pointer 250 points first to a virtual 260, which points in turn to the physical block 232.

As further shown in FIG. 2a, the XCOPY operation 170 is arranged as a logical copy from source range 150 to destination range 160. Both the source range 150 and the destination range 160 correspond to respective LBA ranges in the namespace 210. In accordance with improvements hereof, the XCOPY operation 170 identifies one or more chunks 152 in the source range 150. For example, the XCOPY 170 identifies chunks 152a and 152b. In an example, each chunk 152 includes a range of contiguous logical blocks 214 that map to a single leaf page 226. For instance, a chunk 152 may be aligned to a particular address 212a that is known to mark the beginning or middle of a particular leaf page 226. To ensure that chunks are mapped by respective leaf pages 226, the size of each chunk 152a is preferably no larger than the amount of data that can be mapped by a single leaf page 226. For a leaf page capable of mapping 2 MB of data, for example, a chunk size of 1 MB may be selected. Other options may include 2 MB, or sizes smaller than 1 MB. Preferably, chunk size is an integer submultiple of leaf page capacity. One should appreciate that selecting a chunk size that enable chunks to be mapped by individual leaf pages 222 is an optimization rather than a requirement.

In the example shown, the data of chunk 152a is mapped entirely by the leaf page 226s, which is accessed by a pointer in top page 222s and a pointer in mid page 224s. Also, a single virtual page 228s may contain all virtuals 250 for mapping all the data of chunk 152a. In other examples, virtuals 250 may be distributed across multiple virtual pages 228, however.

As already mentioned, the XCOPY 170 specifies not only a source range 150 but also a destination range 160. For copying data from source to destination, the XCOPY 170 proceeds by logically copying chunks 152 to corresponding chunks 162 in the destination range (e.g., chunks 162a and 162b). The chunks 162 are the same size as the respective chunks 152. As with the source chunks 152, the destination chunks 162 are also aligned so that they map to particular leaf pages 226. For example, chunk 162a is aligned so that all of its data can be mapped to a single leaf page 226d, via a top page 222d and a mid page 224d. At the time of the XCOPY 170, the destination mapping pages 222d, 224d, and 226d may not exist, so that it may be necessary to allocate the pages 222d, 224d, and 226d to complete the XCOPY. Alternatively, some of or all of the pages 222d, 224d, and 226d may exist already and may be used for mapping existing data, which will be overwritten once the XCOPY operation 170 is complete. A virtual page 228d, or multiple such pages, may be used for mapping any existing data.

One may recognize that the source range 150 includes not only chunks 152 but also regions 154a and 154b, which are not contained within any chunks 152. In an example, logical blocks 214 within regions 154a and 154b may be logically copied to corresponding locations in the destination range 160 by conventional techniques, e.g., by using block-based deduplication.

Figure 2B:
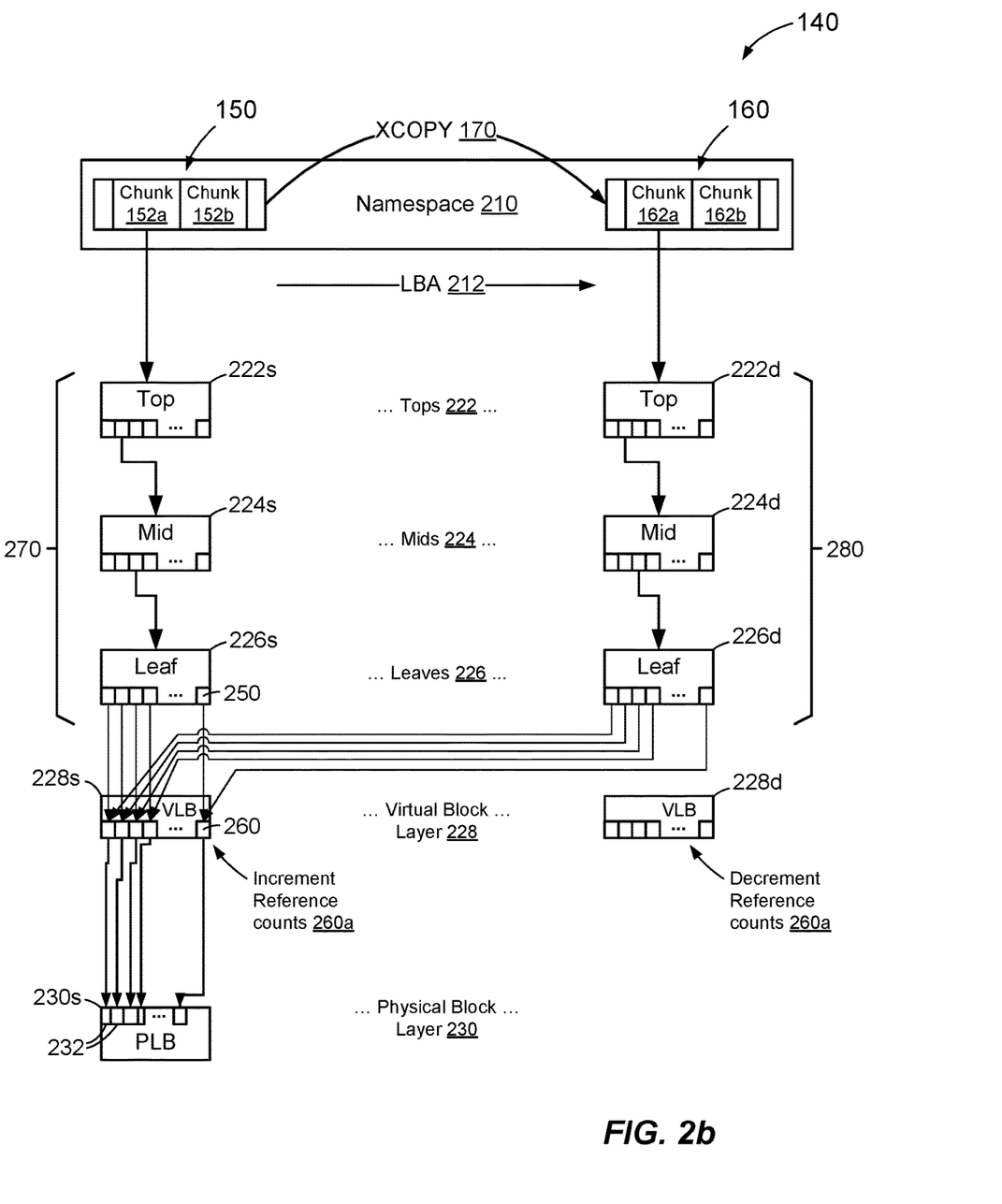

FIG. 2b shows a high-level overview of additional activities that accompany the XCOPY operation 170. Here, a series of source-mapping pages 270 is copied to a corresponding series of destination-mapping pages 280. The source-mapping pages 270 include the above-described pages 222s, 224s, and 226s (top, mid, and leaf), which are used for mapping the data of the chunk 152a. The destination-mapping pages 280 include a top page 222d, a mid page 224d, and a leaf page 226d, which are provided for mapping the data of the destination chunk 162a. Pages 222d, 224d, and 226d may be newly-allocated pages and/or they may be previously-allocated pages that map existing data, i.e., data already found in the chunk 162a. In the case where existing data was present, virtual page 228d may point to associated physical blocks (not shown).

To implement the copy of source chunk 152a to destination chunk 162a, the data path 140 copies the block pointers in top page 222s to top page 222d. It also copies the block pointers in mid page 224s to mid page 224d. It further copies the block pointers in leaf page 226s to leaf page 226d. Preferably, the copying of pointers of top page 222s and mid page 224s adjusts for different offsets of destination pages 280 so that relative pointing between destination pages 280 is analogous to relative pointing between source pages 270. Upon copying the pointers, the leaf pointers 250 in the destination leaf page 226d point to the same virtuals 260 as do the leaf pointers 250 in the source leaf page 226s. Thus, the reference count 260a of each virtual 260 pointed to by leaf page 226 is incremented by one. For example, each reference count 260a is increased from one to two. Also, any reference counts 260a of virtuals 260 previously used at the destination are decremented. For example, a virtual 260 previously used for data that is now overwritten will be reduced by one.

In the event of any redirects, e.g., where there is a mismatch between the generation count 250c of a destination leaf pointer 250 and the generation count 260d of a pointed-to virtual 260, the destination leaf pointer 250 may be adjusted to point to a virtual at the location specified by the redirect pointer 260c. In such cases, the reference count 260a to be incremented is the reference count of the virtual at the redirected location.

In an example, the processing associated with FIG. 2b may be performed in batches, e.g., by processing all leaf pointers 250 for chunk 162a together at once, and by processing reference-count updates to all affected virtuals 260 together at once. In this manner, chunk-based processing may be accomplished with high efficiency.

Once the source-mapping pages 270 have been copied to the destination-mapping pages 280 and associated updates and adjustments are made, the XCOPY 170 is complete with regard to chunk 152a. Similar activities may then be conducted for chunk 152b, and for any other chunks 152. In some examples, multiple chunks 152 may be processed in parallel. Any data of the source range 150 not found in a chunk (regions 154a and 154b) may be logically copied in the conventional way, e.g., by reading the data from the source 150 and writing it back at the destination, preferably using deduplication.

The depicted XCOPY operation 170 results in significant performance gains. In preliminary testing, for example, the XCOPY operation 170 results in greater than a factor of ten improvement in copying speed.

In some cases, complications can arise when logically copying chunks 152 from a source range to a destination range. For example, deadlocks can occur unless system protocols are carefully followed. One such protocol specifies that, where there is a parent-child relationship between two pages, a child should generally be locked before the parent. This protocol can lead to inefficiencies in the context of XCOPY, as parent-child relationship between mapping pages are generally unknown. For example, a mapping page for an XCOPY destination 160 might be the parent of a corresponding mapping page for an XCOPY source 150, but it might also be a child. In practice this means that it may be necessary to read source-mapping pages 270 (which involves taking locks), reading destination-mapping pages 280 (which involves taking additional locks), and checking whether any parent-child relationship exists between the pages. If the locks are taken in the wrong order, the locks may have to be released and new locks may have to be taken in the proper order. All of this locking and unlocking consumes valuable time and can undermine the high efficiency of the XCOPY operation 170.

Figure 3:
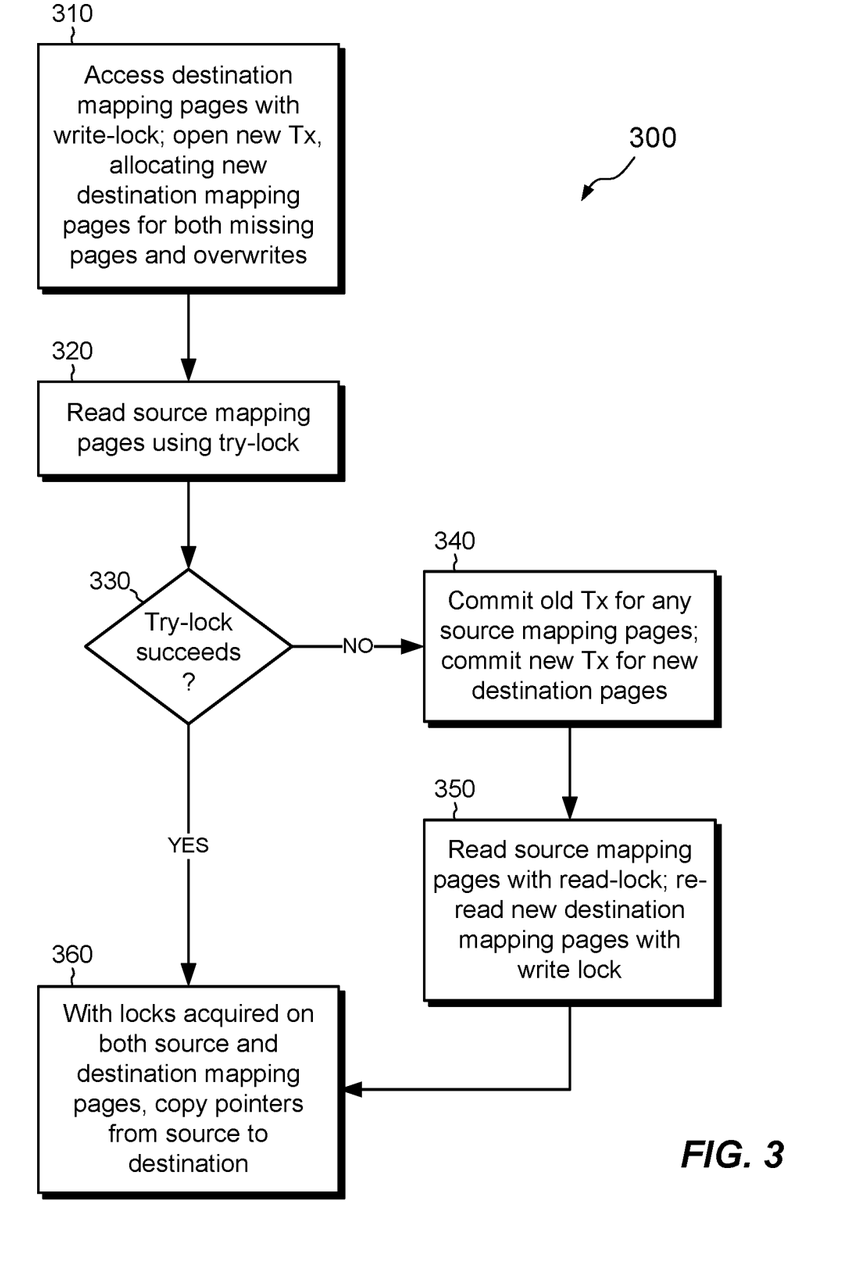
FIG. 3 is a flowchart showing an example method of accessing source and destination mapping pages for efficiency and for avoiding deadlocks.

FIG. 3 shows an example method 300 of efficiently accessing source-mapping pages 270 and destination-mapping pages 280 while avoiding deadlocks. The method 300 may be performed, for example, by one or more threads running on the node 120a.

At 310, node 120a accesses the destination-mapping pages under a write-lock. For example, node 120a may open a new transaction (Tx) in the metadata transaction log 134 (FIG. 1). The new transaction specifies new destination-mapping pages 280 to be allocated. Notably, the new destination-mapping pages 280 are to be allocated regardless of whether destination-mapping pointers already exist for the specified destination range 160, i.e., regardless of whether the XCOPY results in an original write or an overwrite. By definition, the newly-allocated destination-mapping pages 280 cannot be parents of the source-mapping pages 270. Rather, they are either new pages or they are copies of existing pages.

At 320, the node 120a accesses the source-mapping pages 270 for reading using a try-lock. A "try-lock" is a special type of lock which is designed to return a failure immediately if the requested lock cannot be taken. The try-lock does not wait for requested pages to become free. For example, taking a try-lock on page 226s will immediately return a failure if any other thread is accessing any of the same pages. If the try-lock succeeds, however, the try-lock may immediately return a pass result and may assert the requested lock, which in this case may be done by locking the source-mapping pages 270 for reading.

At 330, node 120a determines whether the try-lock succeeded or failed. If the try-lock failed, then operation proceeds to 340, whereupon the node 120a commits any pending transactions in the metadata transaction log 134. As the try-lock will typically fail if there are uncommitted transactions on any of the source-mapping pages 270, committing these transactions completes the specified changes on the source pages and removes any existing locks. At the same time, node 120a also commits the new transaction (from step 310) for allocating the new destination-mapping pages 280, thereafter releasing the write lock on those pages.

At 350, the node 120a reads the (now free) source-mapping pages 270 under a read-lock. It also re-reads the (now committed and free) destination mapping pages 280 under a new write lock.

With locks acquired on both source-mapping pages 270 and destination-mapping pages 280, operation proceeds to step 360, whereupon the node 120a copies the mapping pointers from the source-mapping pages 270 to the destination-mapping pages 280, e.g., as described in connection with FIG. 2b above. Note that step 360 is also reached directly from step 330 if the try-lock succeeds. Copying the pointers may itself be performed as part of an additional transaction (not shown), which itself may be committed to complete the update of the destination-mapping pointers 280. Any additional processing of the pointers being copied may be done under the same additional transaction. Any further changes, such as reference count updates in virtuals 260, may also be done under the same additional transaction, or in some cases under a separate transaction.

One should appreciate that the method 300 successfully avoids deadlocks that could otherwise result from accessing a parent page before accessing a child page of that parent. In particular, step 310 ensures that the destination pages cannot be parents of the source pages 270 by allocating new destination pages 280. As new destination pages are allocated for both existent and non-existent destination mapping pages, the method 300 may consume more metadata than is strictly required. But the consumption of additional metadata is justified by the improvement in performance.

Figure 4:
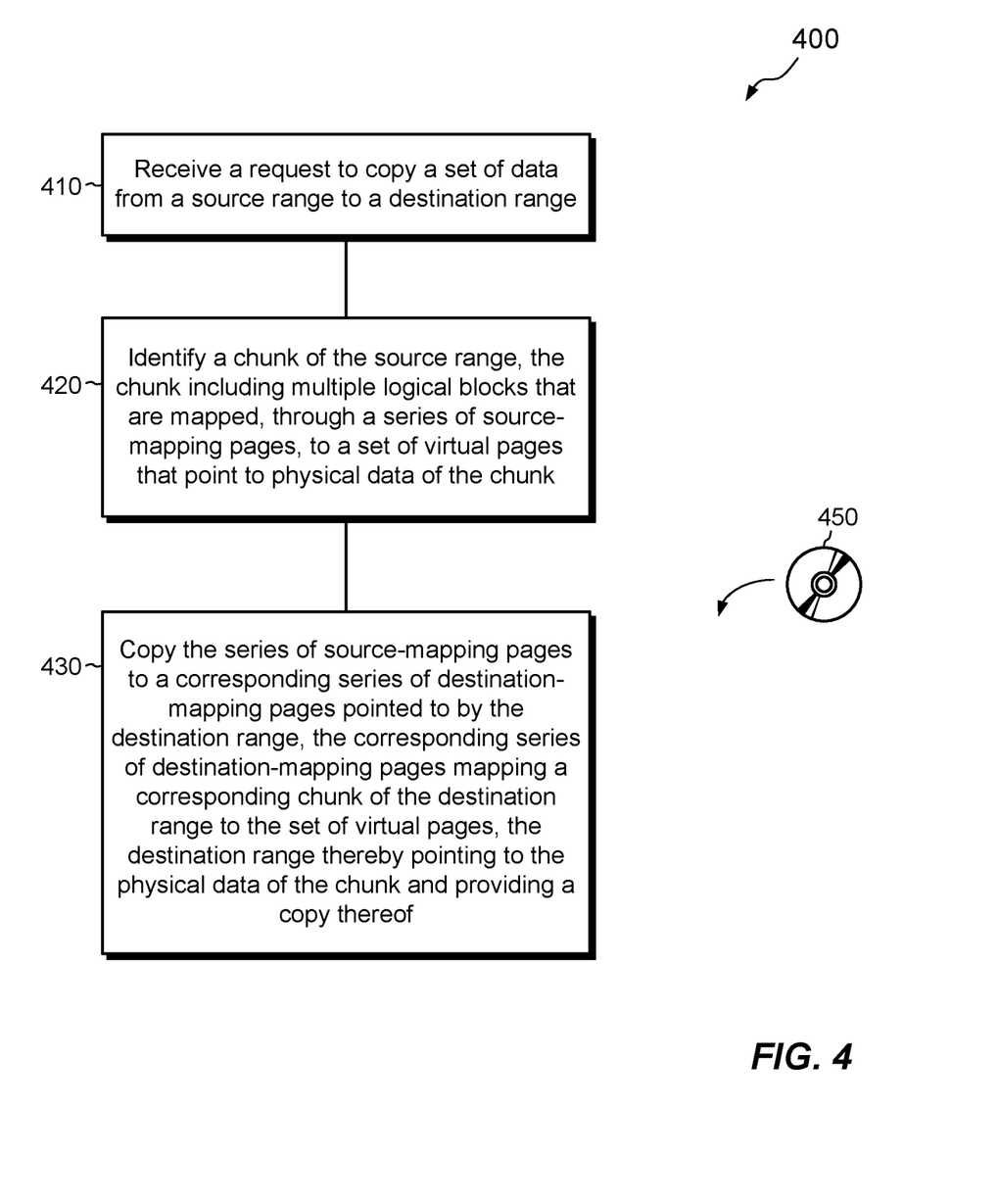
FIG. 4 is a flowchart showing an example method of copying data.

FIG. 4 shows an example method 400 that may be carried out in connection with the environment 100 and provides an overview of some of the features described above. The method 400 is typically performed, for example, by the software constructs described in connection with FIG. 1, which reside in the memory 130 of the node 120a and are run by the set of processors 124. The various acts of method 400 may be ordered in any suitable way. Accordingly, embodiments may be constructed in which acts are performed in orders different from that illustrated, which may include performing some acts simultaneously.

At 410, a request 118 is received to copy a set of data from a source range 150 to a destination range 160. The request 118 may be provided as an XCOPY command, which directs the data storage system 116 to perform the requested copy.

At 420, a chunk 152 of the source range 150 is identified. The chunk 152 includes multiple logical blocks 214 which are mapped, through a series of source-mapping pages 270, to a set of virtual pages 228 that point to physical data 232 of the chunk 152.

At 430, the series of source-mapping pages 270 is copied to a corresponding series of destination-mapping pages 280 pointed to by the destination range 160. The corresponding series of destination-mapping pages 280 maps a corresponding chunk 162 of the destination range 160 to the set of virtual pages 228. The destination range 160 thereby points to the physical data 232 of the chunk 152 of the source range 150 and provides a copy thereof.

An improved technique has been described for copying data from a source range 150 to a destination range 160. The technique includes identifying a chunk 152 of the source range 150. The chunk 152 includes multiple logical blocks 214 that map, through a series of source-mapping pages 270, to a set of virtual pages 228 that point to physical data 232 of the chunk 152. The technique further includes copying the series of source-mapping pages 270 to form a corresponding series of destination-mapping pages 280 pointed to by the destination range 160, so that a corresponding chunk 162 of the destination range 160 maps, via the series of destination-mapping pages 280, to the same set of virtual pages 228 mapped to by the series of source mapping pages 270. The destination range 160 thereby points to the same data as the source range 150 and provides a copy thereof.

Having described certain embodiments, numerous alternative embodiments or variations can be made. For example, although embodiments have been described in connection with a particular mapping arrangement that involves tops, mids, leaves, and virtuals, this is merely an example. Alternatively, embodiments may be constructed that include different numbers and/or types of mapping pages from those shown.

Also, although embodiments have been described in connection with a single logical address space (namespace 210), this is also merely an example. Alternatively, embodiments may be constructed that arrange logical data differently from the manner shown, including providing different logical address spaces for different data objects.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of copying data, comprising:
    receiving a request to copy a set of data from a source range to a destination range;
    identifying a chunk of the source range, the chunk including multiple logical blocks that are mapped, through a series of source-mapping pages, to a set of virtual pages that point to physical data of the chunk;
    copying the series of source-mapping pages to provide a corresponding series of destination-mapping pages pointed to by the destination range, the corresponding series of destination-mapping pages mapping multiple logical blocks in a corresponding chunk of the destination range to the set of virtual pages, the destination range thereby pointing to the physical data of the chunk of the source range and providing a copy thereof.

2. The method of claim 1, wherein the source range and the destination range are both located within a logical address space of a storage system.

3. The method of claim 2, wherein the series of source-mapping pages includes a source-leaf page that points to the set of virtual pages, the source-leaf page including pointers that map every one of the logical blocks of the chunk.

4. The method of claim 2, wherein the method further comprises, prior to copying the series of source-mapping pages:
    accessing the series of destination-mapping pages with a write-lock; and
    allocating a new destination-mapping page for each of the series of destination-mapping pages.

5. The method of claim 4, wherein at least one of the new destination-mapping pages does not replace any previously allocated destination-mapping page.

6. The method of claim 4, wherein at least one of the new destination-mapping pages replaces an old destination mapping page that already exists.

7. The method of claim 6, wherein a parent-child relationship exists between the old destination-mapping page and one of the series of source-mapping pages, and wherein allocating the new destination-mapping page causes the new destination mapping page to have no parent-child relationship with any of the series of source-mapping pages.

8. The method of claim 4, further comprising accessing the series of source-mapping pages for reading using a try-lock, the try-lock configured to return a failure result if the try-lock cannot be obtained.

9. The method of claim 8, wherein the method further comprises, responsive to the try-lock returning the failure result:
    committing, in a transaction log, a transaction that involves at least one of the series of source-mapping pages; and
    after committing the transaction, accessing the series of source-mapping pages using a read-lock.

10. The method of claim 9, wherein copying the series of source-mapping pages to the corresponding series of destination-mapping pages includes copying mapping pointers from the series of source-mapping pages to the new destination-mapping pages.

11. A computerized apparatus, comprising control circuitry that includes a set of processors coupled to memory, the control circuitry constructed and arranged to:
    receive a request to copy a set of data from a source range to a destination range;
    identify a chunk of the source range, the chunk including multiple logical blocks that are mapped, through a series of source-mapping pages, to a set of virtual pages that point to physical data of the chunk;
    copy the series of source-mapping pages to provide a corresponding series of destination-mapping pages pointed to by the destination range, the corresponding series of destination-mapping pages mapping multiple logical blocks in a corresponding chunk of the destination range to the set of virtual pages, the destination range thereby pointing to the physical data of the chunk of the source range and providing a copy thereof.

12. A computer program product including a set of non-transitory, computer-readable media having instructions which, when executed by control circuitry of a computerized apparatus, cause the computerized apparatus to perform a method of copying data, the method comprising:
receiving a request to copy a set of data from a source range to a destination range;
identifying a chunk of the source range, the chunk including multiple logical blocks that are mapped, through a series of source-mapping pages, to a set of virtual pages that point to physical data of the chunk;
copying the series of source-mapping pages to provide a corresponding series of destination-mapping pages pointed to by the destination range, the corresponding series of destination-mapping pages mapping multiple logical blocks in a corresponding chunk of the destination range to the set of virtual pages, the destination range thereby pointing to the physical data of the chunk of the source range and providing a copy thereof.

13. The computer program product of claim 12, wherein the source range and the destination range are both located within a logical address space of a storage system.

14. The computer program product of claim 13, wherein the series of source-mapping pages includes a source-leaf page that points to the set of virtual pages, the source-leaf page including pointers that map every one of the logical blocks of the chunk.

15. The computer program product of claim 13, wherein the method further comprises, prior to copying the series of source-mapping pages:
accessing the series of destination-mapping pages with a write-lock; and
allocating a new destination-mapping page for each of the series of destination-mapping pages.

16. The computer program product of claim 15, wherein at least one of the new destination-mapping pages does not replace any previously allocated destination-mapping page.

17. The computer program product of claim 15, wherein at least one of the new destination-mapping pages replaces an old destination mapping page that already exists.

18. The computer program product of claim 17, wherein a parent-child relationship exists between the old destination-mapping page and one of the series of source-mapping pages, and wherein allocating the new destination-mapping page causes the new destination mapping page to have no parent-child relationship with any of the series of source-mapping pages.

19. The computer program product of claim 15, further comprising accessing the series of source-mapping pages for reading using a try-lock, the try-lock configured to return a failure result if the try-lock cannot be obtained.

20. The computer program product of claim 19, wherein the method further comprises, responsive to the try-lock returning the failure result:
committing, in a transaction log, a transaction that involves at least one of the series of source-mapping pages; and
after committing the transaction, accessing the series of source-mapping pages using a read-lock.

21. The method of claim 1, wherein copying the series of source-mapping pages to the corresponding series of destination-mapping pages includes adjusting pointers of at least one of the destination-mapping pages for offsets so that relative pointing between the series of destination-mapping pages is analogous to relative pointing between the series of source-mapping pages.

* * * * *